United States Patent Office 3,015,467
Patented Jan. 2, 1962

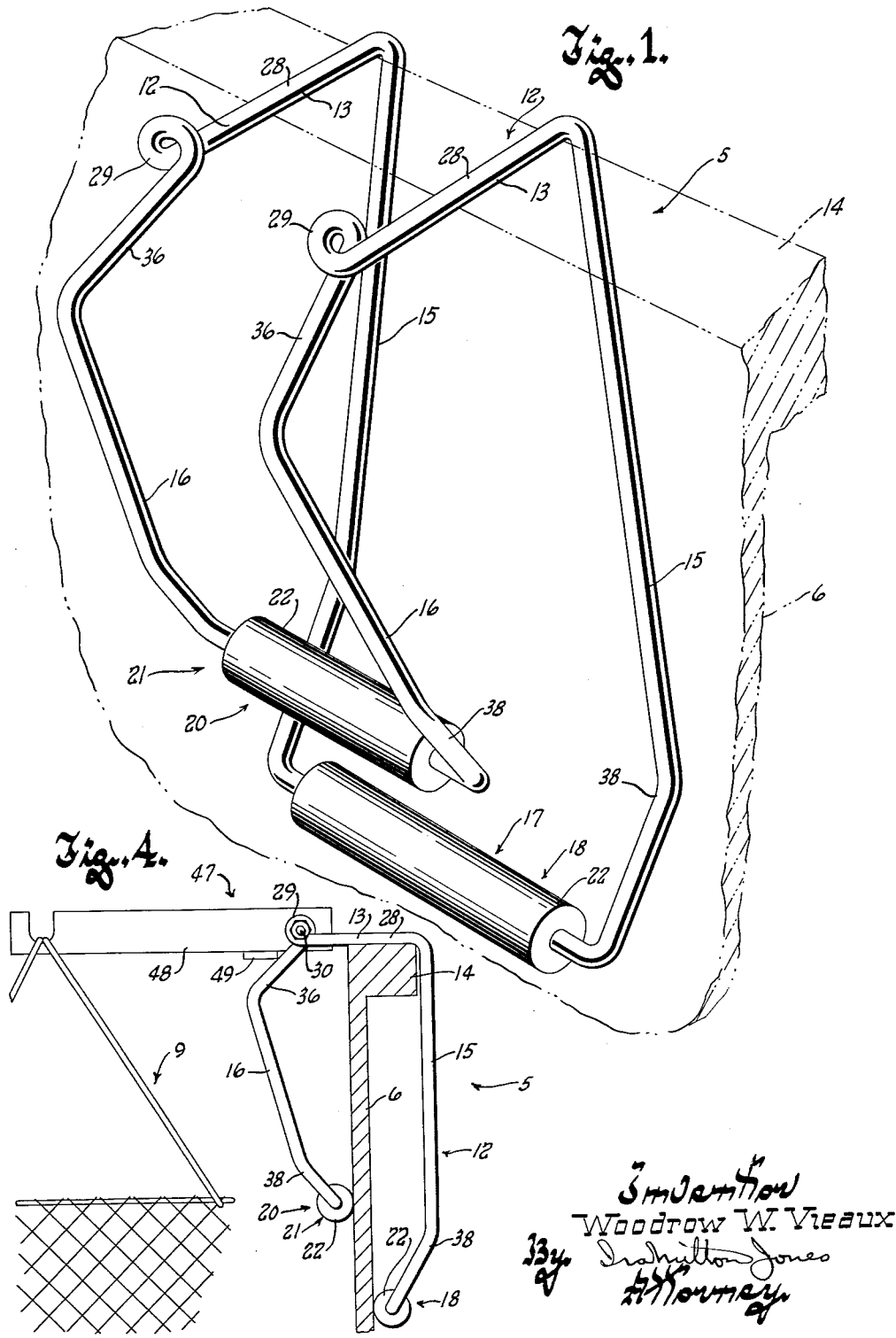

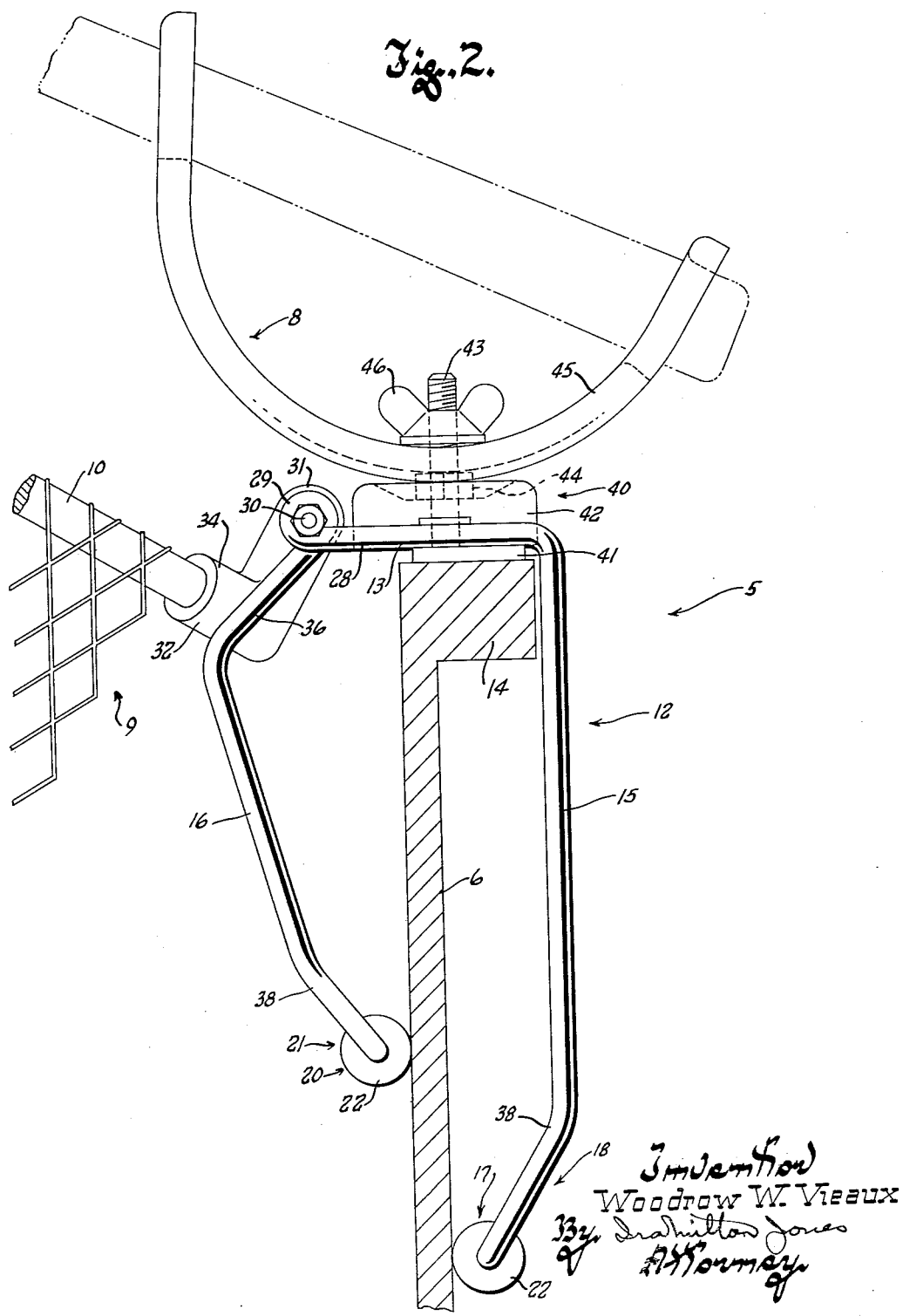

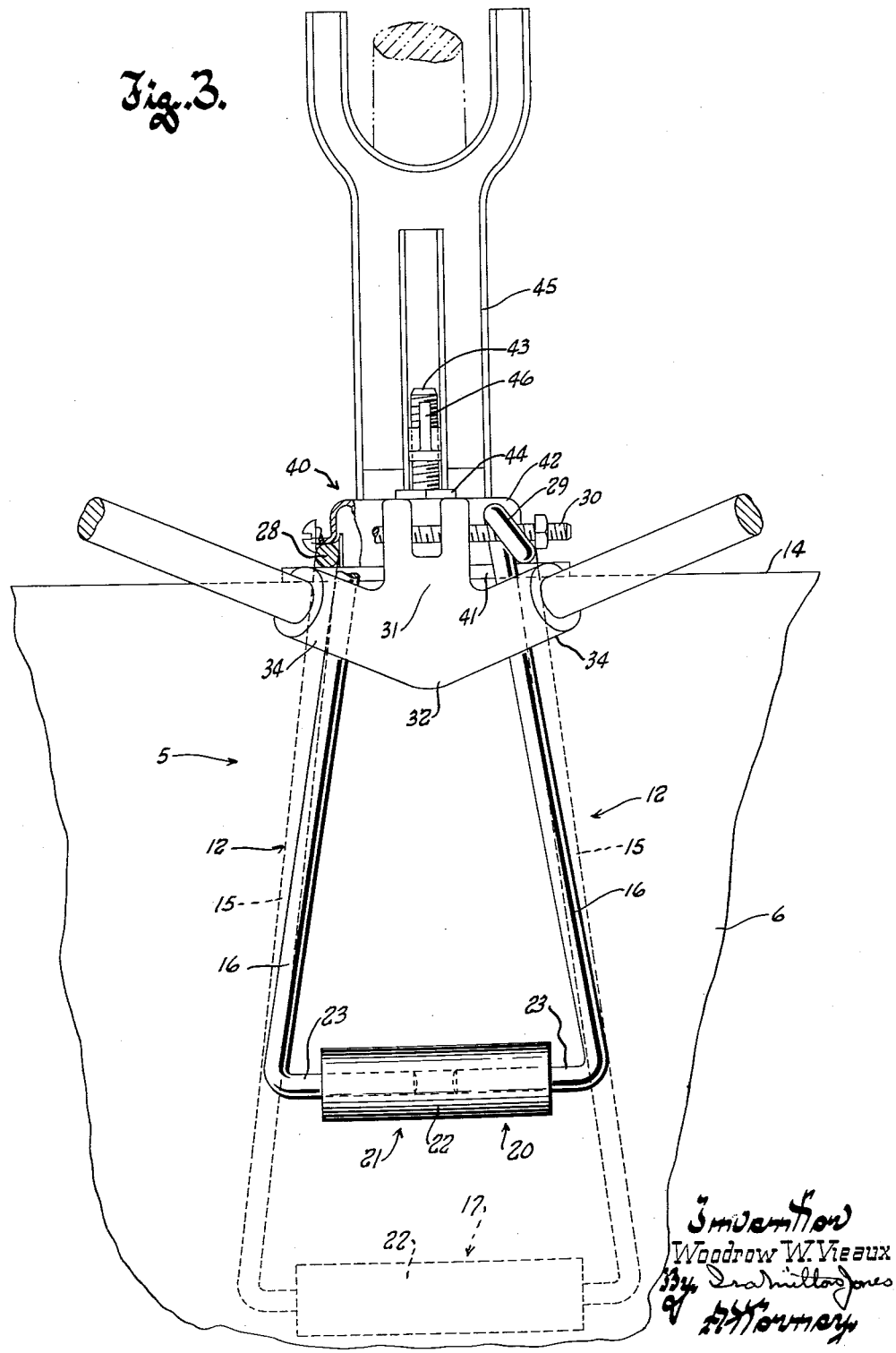

3,015,467
CLAMP FOR MOUNTING FISHING ACCESSORIES ON SMALL BOATS
Woodrow W. Vieaux, 819 Lakeside Place, Green Bay, Wis.
Filed July 6, 1959, Ser. No. 825,260
4 Claims. (Cl. 248—226)

This invention relates to fishing gear or equipment, and has more particular reference to a readily attachable and removable clamp for mounting such accessories as fish impounding bags and nets as well as fishing poles onto the side wall of a small boat.

Heretofore various devices have been proposed to enable fishing poles, fish impounding nets and the like to be supported from the side wall of a small boat. In every instance, however, either a special bracket or a clamp had to be provided to support each such article of fishing equipment from the side of the boat, or the clamp was made a part of the net or pole holder.

The present invention has as its objective to provide a simple and inexpensive self retaining spring clamp, which may be easily applied to and removed from the upper portion of the side wall of a small boat, and which serves as an all purpose adaptor bracket to receive any of a number of fishing accessories and to support the same at a handy location adjacent to the rail of the boat.

More specifically, it is a purpose of this invention to provide a spring clamp of the character described, which is made almost entirely from a single length of wire having resilient characteristics, and which is constructed to serve as a bracket that enables a pole holding device and/or a fish impounding net to be readily supported from the side wall of a boat.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a perspective view of a clamp of this invention illustrating the manner in which it may be applied to the side wall of a boat;

FIGURE 2 is a cross sectional view through the upper portion of the side wall of a boat showing the clamp of this invention in place thereon and supporting both a fish impounding net, in a position alongside the boat, and a fishing pole holder;

FIGURE 3 is an elevational view of the clamp and accessories shown in FIGURE 2 as seen from the exterior of the boat; and FIGURE 4 is a view similar to FIGURE 2 showing how the clamp of this invention may be readily employed to support another type of net.

Referring now more particularly to the accompanying drawings, in which like reference characters have been applied to like parts throughout the several views, the numeral 5 designates generally the clamp of this invention which is adapted to be engaged over the upper portion of a side wall 6 of a small boat, such as an ordinary row boat, and to serve as a bracket to receive and support any of a number of presently available fishing accessories.

Two such accessories are illustrated in FIGURE 2.

One of them is a fishing pole holder 8 which may be connected to and supported from the top of the clamp 5, and the other is a fish impounding net 9 having a circular frame 10, which may also be attached to and supported from the upper portion of the clamp.

The clamp of this invention is made almost entirely from wire having resilient characteristics, and it is preferably bent from a single length of such wire into a shape providing a pair of spaced apart and opposing inverted U-shaped spring members 12 disposed in side-by-side relationship. Each of the spring members 12 has a bight portion 13 which is adapted to extend over the rail 14 at the upper edge of the side wall 6 of a boat, and opposite inner and outer legs 15 and 16, respectively, which are biased toward one another and extend downwardly from the bight portion 13 to clampingly embrace the side wall 6. The bight portions each consist of angularly disposed inner and outer sections 28 and 36 respectively, connected by a loop 29.

At their lower ends the inner legs 15 of the two spring members are connected by bridge means, indicated generally by the numeral 17, defining the bight of a U-shaped inner jaw 18 on the clamp. Similarly, the lower ends of the outer legs 16 of the two spring members 12 are connected by other bridge means 20 to define the bight of a U-shaped outer jaw 21 on the clamp. The jaws 18 and 21 are yieldingly urged toward one another by the bias on the legs 15 and 16 of the inverted U-shaped spring members 12, and portions of the two jaws are adapted to engage with the inner and outer surfaces, respectively, of the side wall of a boat near the top thereof. Since the outer legs 16 of the spring members are shorter than their inner legs 15, the bight portions of the two jaw members are vertically offset with respect to one another.

As best shown in FIGURE 1, the bridge means 17 and 20 comprise elongated rollers 22 that are freely rotatably journaled on the bight portions of the inner and outer jaws to facilitate the application of the clamp to the upper portion of the side wall of a boat, so that it is merely necessary to spread the jaws 18 and 21 apart against the bias tending to hold them together to enable the rollers 22 to be passed over the opposite sides of the rail 14 on the top of the side wall. Thereafter the clamp may be "rolled" into place by pressing downwardly on the top of it until the bight portions 13 of the two inverted U-shaped members are engaged with the top of the rail 14.

The wire of which the clamp is made can form the journal for the rollers 22, each of the rollers being provided for that purpose with a coaxial bore in which the wire is rotatably receivable. One of the rollers may be slid endwise onto the bight portion of its jaw member before the clamp is completely bent to shape. The other roller, in this case illustrated as that of the bridge means 20 of the outer jaw, is rotatably supported on the end portions 23 of the wire from which the clamp is bent, which are formed into coaxial inward extensions of the outer legs 16 terminating short of one another, and which can be endwise spread apart by flexing of the wire to permit them to clear the ends of the roller and be engaged in the bore therein.

From the construction discussed thus far, it will be readily apparent that the rollers 22 on the inner and outer jaws will be forcefully and clampingly engaged with the opposite surfaces of the side walls 6 of the boat whenever the clamp is applied thereto, by reason of the fact that the legs 15 and 16 of each of the inverted U-shaped spring members are biased towards one another. It will be understood that the rollers engage or clamp about the upper portion of the side wall of the boat with a force sufficient to firmly hold the clamp in place thereon without need for any additional securing means such as screws or the like.

The clamp of this invention includes means on the bight portions of the two inverted U-shaped members 12 for receiving and supporting a fishing accessory, which means comprises horizontally coaxial eyelets provided by the loops 29. These eyelets are preferably located a substantial distance from the bases of the inner legs of the spring members so as to be spaced beyond the outer surface of the side wall of a boat on which the clamp is installed to thereby assure clearance between the upper portion of the side wall and a net connected to said eyelets and thus supported from the clamp of this invention. It is also to be noted that the section 28 of the bight portion of each U-shaped spring member is straight and horizontal between the eyelet or loop 29 and the base of the inner leg of said member and extends completely across the rail 14 and a distance beyond the outer side of the wall 6 of the boat.

The eyelets 29 are adapted to receive an elongated bolt 30 which may be passed through the hub portion 31 of a forked bracket 32 such as is provided with a fish impounding net 9 of a type that is presently available on the open market. The bracket of this type of net has outwardly diverging arms 34 which extend from its hub portion 31 and in which are secured the ends of the frame 10 that supports the net.

According to this invention the outer sections 36 of the bight portions 13 of the U-shaped spring members 12 are bent to a downwardly and outwardly inclined angle to the horizontal sections 28 of the bights to provide surfaces upon which the arms 34 of the bracket 32 may rest when the hub portion 31 of the bracket is connected to the eyelets by means of the bolt 30. Because of the downward and outward inclination of the bight sections 36, it will be noted that the frame 10 of the net is held at an upward and outward inclination which facilitates the loading of fish thereinto from inside the boat.

It should also be noted that the lower end portions of the legs of each of the inner and outer jaws are bent toward one another as at 38, so that the clamp of this invention is easily able to accommodate the rail 14 on the top of the side wall 6 of the boat.

Referring to FIGURES 2 and 3 it will be noted that the straight, horizontal sections 28 of the inverted U-shaped spring members have a length sufficient to accommodate the clamping structure 40 of a fishing pole holder 8 of a type that is presently available upon the open market. In the fishing pole holder illustrated in FIGURES 2 and 3 the clamping structure comprises a bar 41 which rests on top of the rail 14, beneath the straight, horizontal section 28 of the clamp of this invention, and a block 42 that is secured to the bar 41 and is adapted to overlie the straight, horizontal section 28. A stud 43 anchored in the bar 41, projects upwardly through the block 42, and the block and bar are held in clamping relationship by means of a lock nut 44 on the stud. The stud projects upwardly a substantial distance above the block 42 to be received in an elongated slot in a rocker-like bracket 45 of the fishing pole holder 8. A wing nut 46 on the uppermost portion of the stud 43 is adapted to clamp the rocker-like bracket 45 against the top of the block 42 in any of a number of different positions of angular adjustment.

The eyelets 29 also provide for mounting on the clamp of this invention a different type of impounding net such as indicated at 47 in FIGURE 4. As therein shown, the net is suspended from a substantially horizontal beam 48 by means of an elongated bolt 30 that is received in the eyelets and passes through the inner end of the beam. A transverse cleat 49 secured to the underside of the beam 48 rests upon the inclined bight sections 36 of the spring members, outwardly of the eyelets, to hold the beam horizontal.

From the foregoing description taken together with the accompanying drawings, it will be readily apparent that this invention provides an exceptionally simple and inexpensive spring clamp which may be readily removably attached, without screws, bolts or the like, to the upper portion of the side wall of a small boat, and which serves as a bracket to which any of a number of different fishing accessories may be easily secured.

What is claimed as my invention is:

1. A self retaining spring clamp enageable over the side wall of a boat or the like to serve as a supporting bracket for a fish net or other fishing accessory, said clamp being made from a continuous length of strong spring wire, and comprising: a pair of spaced apart side-by-side substantially identical inverted U-shaped members, each having a bight and long and short legs depending from opposite ends of the bight, the long legs having their lower end portions bent towards the short legs and under their respective bights; bridge means spanning and connecting the lower ends of the long legs and comprising a roller rotatably carried by the lower ends of said long legs and cooperating therewith to define a first U-shaped jaw; other bridge means spanning and connecting the lower ends of the short legs and likewise comprising a roller rotatably carried by the lower ends of the short legs and cooperating therewith to define a second U-shaped jaw; said rollers normally occupying positions from which they must be moved by forcibly spreading the jaws apart to enable the placement of the clamp upon the side wall of a boat or the like, the rotatability of the rollers facilitating said placement of the clamp and the difference in length between the long and short legs, causing the spring tension in the legs to maintain the upper ends of the long legs against the side of the wall when the clamp is mounted; and means on said bights intermediate the junctions thereof with their respective legs providing for the attachment of a fishing accessory to the clamp.

2. The clamp of claim 1, wherein said last-named means provides axially aligned bearings; and further characterized by: a forked bracket member having a hub and arms which diverge outwardly from one end of the hub; pivot means carried by said aligned bearings and passing through the other end of said hub to pivotally mount the bracket on the clamp with the arms of the bracket extending across and resting on the bight portions between the junctions thereof with the short legs and said bearings; and a fish impounding net carried by the bracket arms.

3. The spring clamp of claim 1, wherein said last named means comprises opposing supports formed by eyelet loops integral with the wire from which the clamp is made, said eyelet loops being disposed on a common horizontal axis transversely of the bights and providing for pivotally attaching a fishing accessory to the clamp for back and forth swinging motion, over the top of the side wall of a boat having the clamp thereon.

4. The spring clamp of claim 3, wherein the eyelet loops are connected with the upper ends of the short legs by stretches of the bights that extend at a downward inclination from the eyelet loops and cooperate with the latter to support an accessory on the clamp; and wherein the bight portions which extend from the eyelet loops to the upper ends of the long legs are substantially straight and horizontal and provide for the attachment of another accessory to the clamp.

References Cited in the file of this patent

UNITED STATES PATENTS

| | | |
|---|---|---|
| 418,420 | North | Dec. 31, 1889 |
| 472,073 | Lamaire | Apr. 19, 1892 |
| 2,524,173 | Peterson | Oct. 3, 1950 |